United States Patent
Bastide et al.

(10) Patent No.: US 8,463,075 B2
(45) Date of Patent: Jun. 11, 2013

(54) DYNAMICALLY RESIZING TEXT AREA ON A DISPLAY DEVICE

(75) Inventors: Paul R. Bastide, Boxford, MA (US); Matthew E. Broomhall, South Burlington, VT (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/854,728

(22) Filed: Aug. 11, 2010

(65) Prior Publication Data

US 2012/0039505 A1    Feb. 16, 2012

(51) Int. Cl.
G06K 9/32    (2006.01)
G06K 9/00    (2006.01)

(52) U.S. Cl.
USPC ........... 382/298; 382/103; 382/107; 382/299; 382/300

(58) Field of Classification Search
USPC .................................. 382/103, 107, 298–300
See application file for complete search history.

(56) References Cited

U.S. PATENT DOCUMENTS

| | | | |
|---|---|---|---|
| 5,218,387 A | 6/1993 | Ueno et al. | |
| 5,731,805 A | 3/1998 | Tognazzini et al. | |
| 5,898,423 A * | 4/1999 | Tognazzini et al. | 345/158 |
| 5,912,721 A * | 6/1999 | Yamaguchi et al. | 351/210 |
| 6,603,491 B2 * | 8/2003 | Lemelson et al. | 715/784 |
| 7,203,911 B2 * | 4/2007 | Williams | 715/864 |
| 7,503,653 B2 * | 3/2009 | Endrikhovski et al. | 351/209 |
| 7,839,423 B2 * | 11/2010 | Ishiyama | 345/660 |
| 7,872,635 B2 * | 1/2011 | Mitchell | 345/158 |
| 2003/0146901 A1 * | 8/2003 | Ryan | 345/158 |
| 2006/0218490 A1 * | 9/2006 | Fink | 715/517 |
| 2008/0147488 A1 * | 6/2008 | Tunick et al. | 705/10 |
| 2008/0316212 A1 | 12/2008 | Kushler | |
| 2009/0164896 A1 | 6/2009 | Thorn | |
| 2010/0045596 A1 | 2/2010 | De Leon | |
| 2012/0038546 A1 * | 2/2012 | Cromer et al. | 345/156 |

OTHER PUBLICATIONS

Yucel et al., "Resolution of focus of attention using gaze estimation and saliency computation," In Proceedings of the 3rd International Conference on Affective Computing and Intelligent Interaction and Workshops, 2009.*

* cited by examiner

*Primary Examiner* — Anand Bhatnagar
*Assistant Examiner* — Soo Park
(74) *Attorney, Agent, or Firm* — Marcia L. Doubet (57) ABSTRACT

Dynamically resizing a text area in which text is displayed on a display device. A camera device periodically captures snapshots of a user's gaze point and head position while reading text, and the captured snapshots are used to detect movement of the user's head. Head movement suggests that the text area is too wide for comfortable viewing. Accordingly, the width of the text area is automatically resized, responsive to detecting head movement. Preferably, the resized width is set to the position of the user's gaze point prior to the detected head movement. The text is then preferably reflowed within the resized text area. Optionally, the user may be prompted to confirm whether the resizing will be performed.

14 Claims, 5 Drawing Sheets

300 — Getting started in Word Pro: Word Pro is a WYSIWYG (What You See Is What You Get) word processor. Word Pro shows you onscreen how a document will appear when it prints. Word Pro adheres to conventions for using menus, dialog boxes, and commands. For example, you can press ESC to cancel any menu or dialog box; you can double-click the icon in the top left corner of the box to close any InfoBox; and you can click the X in the top right corner of a dialog box or InfoBox. From any Help window, you can use the right mouse menu to annotate, copy, print, change the font size, display the Help window on top, or change the system colors. To search for information by category, choose Help Topics from the Help menu. If necessary, choose "Help Topics" if you are asked what type of Help to display. Then click the Index tab, and type an index entry in the box. Next, click Display, and if there is more than one topic, select a topic from the list and click Display again.

A modern-day desk top computer system.

DYNAMICALLY RESIZING TEXT AREA ON A DISPLAY DEVICE

BACKGROUND

The present invention relates to computing environments, and deals more particularly with dynamically resizing a text area, or text element, in which text is displayed on a display device.

In modern computing environments, text is displayed on a display device using a text display element. The text display element is sometimes said to be "hosting" the text. A text display element may occupy the entire available width of the display device, or some portion of the available width. The amount of text displayed on a particular line within the hosting text display element is typically determined by the width of the text display element, in view of the font characteristics which are in effect. Text displayed within a text display element may contain many words on each line, in some cases. Large display devices are becoming increasingly common, and these larger display devices allow for wider text display elements and correspondingly longer (that is, wider) lines of text.

BRIEF SUMMARY

The present invention is directed to dynamically resizing a text area in which text is displayed on a display device. In one aspect, this comprises: responsive to detecting head movement by a user viewing the displayed text, determining a position where the user focused in the displayed text prior to detecting the head movement and dynamically resizing the text area to use the determined position as a new width for the text area. The text may be redisplayed in the dynamically resized text area. Detecting the head movement may further comprise tracking positions of the user's head as the user views the displayed text and comparing the tracked positions of the user's head to determine whether the user's head has moved. Determining a position where the user focused in the displayed text may further comprise tracking positions of the user's eye focus as the user views the displayed text, each tracked position of the user's eye focus associated with one of the tracked positions of the user's head, and responsive to determining that the user's head has moved, determining a particular one of the tracked positions of the user's head which immediately precedes the detected head movement and using, as the determined position where the user focused in the displayed text, the tracked position of the user's eye focus which is associated with the particular one of the tracked positions of the user's head. A plurality of snapshots taken by a camera device are preferably used for tracking the positions of the user's head as the user views the displayed text and for tracking the positions of the user's eye focus as the user views the displayed text.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Existing techniques for displaying text on a display device wrap the text onto a new line when the available display space of the current line of the text display element hosting the displayed text becomes full, without regard to whether the wrapping of the text onto a new line results in readable segments. Often, awkward eye scan and resetting occur, where the user exhibits a "typewriter" effect of moving his eyes along the displayed words until reaching the end of a line, followed by head movement where the user returns his head to the start of the next line and resets his eyes back to the beginning of that next line. As a result, the user can easily lose his place in the displayed text. When the physical size of the display device is relatively large, allowing for longer lines of displayed text within a text display element, the problem is exacerbated. In addition, when the text wraps across a number of lines, it becomes difficult for the user to keep track of which line is the now-current line following a resetting of his eyes after a line wrap. When the user has to concentrate on the physical position of where he is reading within the text, his ability to comprehend the meaning of the text may decrease.

An embodiment of the present invention is directed toward avoiding this typewriter effect by dynamically resizing a text area in which text is displayed on a display device. The text area may be implemented as a text display element, and discussions herein may therefore use the term "text area", "text display area", "text display element", or "display element". Using techniques disclosed herein, it becomes easier for the user to read and comprehend displayed text, and reduces the likelihood that the user will lose his place while reading. This may be particularly beneficial for persons having diminished sight in one eye, where binocular vision is difficult or non-existent.

Computers with integrated camera devices are known in the art, and usage of such devices is becoming commonplace. For example, many people use such devices to establish video-enhanced phone conversations with friends and family members. An embodiment of the present invention preferably leverages technology of this type, configuring the camera to take snapshots of the device user at predetermined intervals, where these snapshots are then evaluated programmatically to determine the user's current eye position and head position with reference to the displayed text. For example, a snapshot might be taken every 2 seconds, every 5 seconds, or every 10 seconds. Optionally, an embodiment of the present invention may be adapted to use a snapshot interval duration that is user-configurable, whereby an individual user can set a particular value to indicate how often the snapshots are taken. In yet another option, an embodiment of the present invention dynamically tunes the interval duration for an individual user. A training sentence or paragraph may be used, for example, where text of a known length is displayed and snapshots are captured to determine how long it takes the user to read this text (or some portion thereof).

Figure 1:
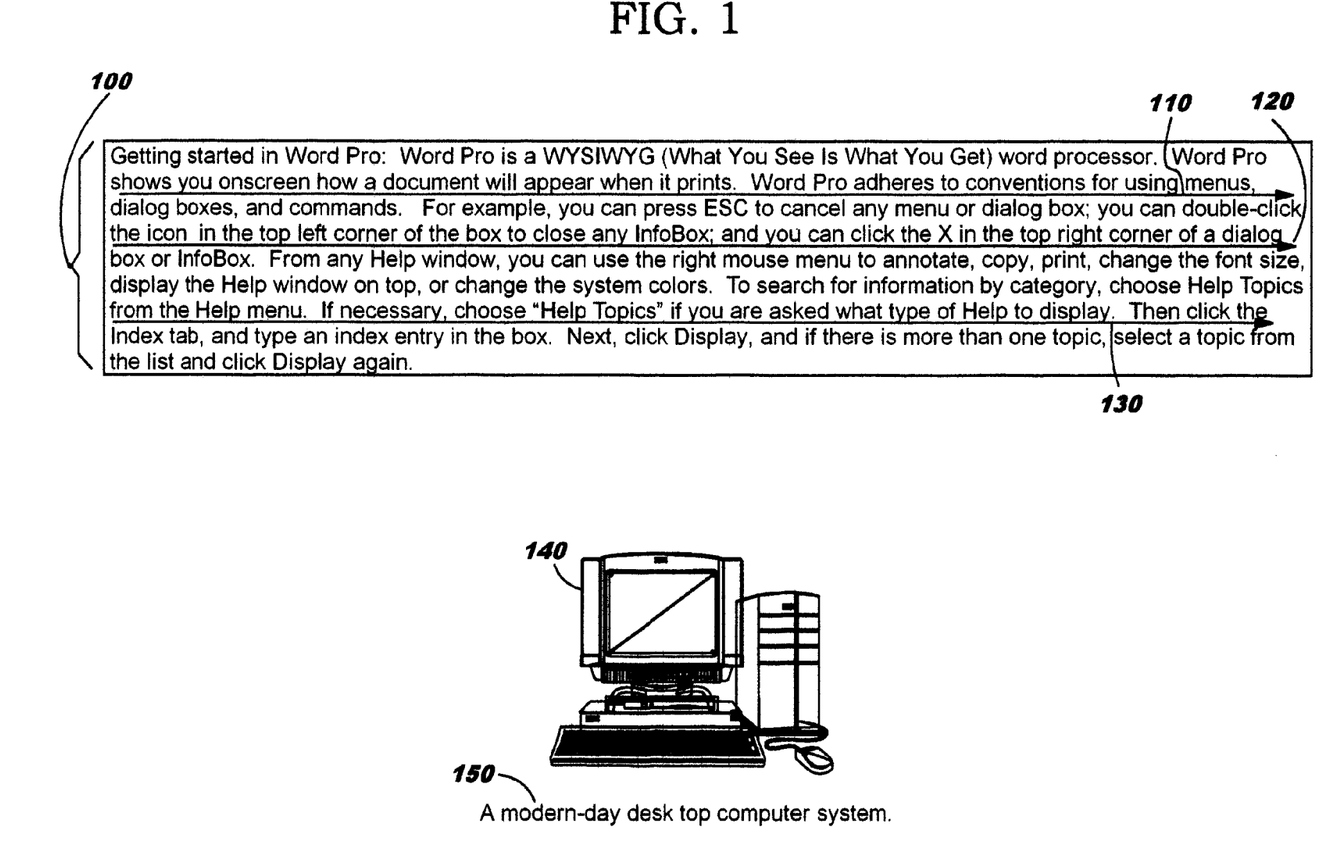
FIG. 1 illustrates an example of displayed text.

FIG. 1 illustrates an example of displayed text. As shown at reference number 100, a text display element which is hosting the text allows the text to occupy (in this example) an entire available width of the display screen. As the user reads a relatively long sentence from this displayed text, the user's eyes move along a displayed line from left to right—or from right to left, alternatively, according to the directionality of the text. Reference numbers 110, 120, 130 graphically illustrate the direction of reading in this example and the corresponding direction in which the user's eyes will move along each line of text. At some point, the user's head will also likely move as it becomes uncomfortable, or perhaps difficult, for the user to continue reading.

Note that while the example in FIG. 1 illustrates the text at reference number 100 occupying the entire screen width, this is by way of illustration and not of limitation. Techniques disclosed herein are also applicable when the text display area occupies less than the entire available width of the display device.

According to techniques disclosed herein, a camera captures snapshots that are used to track the user's eye position and head position, and to determine when the user finishes reading a line of text. In one aspect, the camera is integrated with (e.g., built into) a device which also houses the display device. In another aspect, the camera is independent of the device which houses the display device, but positioned so that it can capture the snapshots of the device user.

Figure 2:
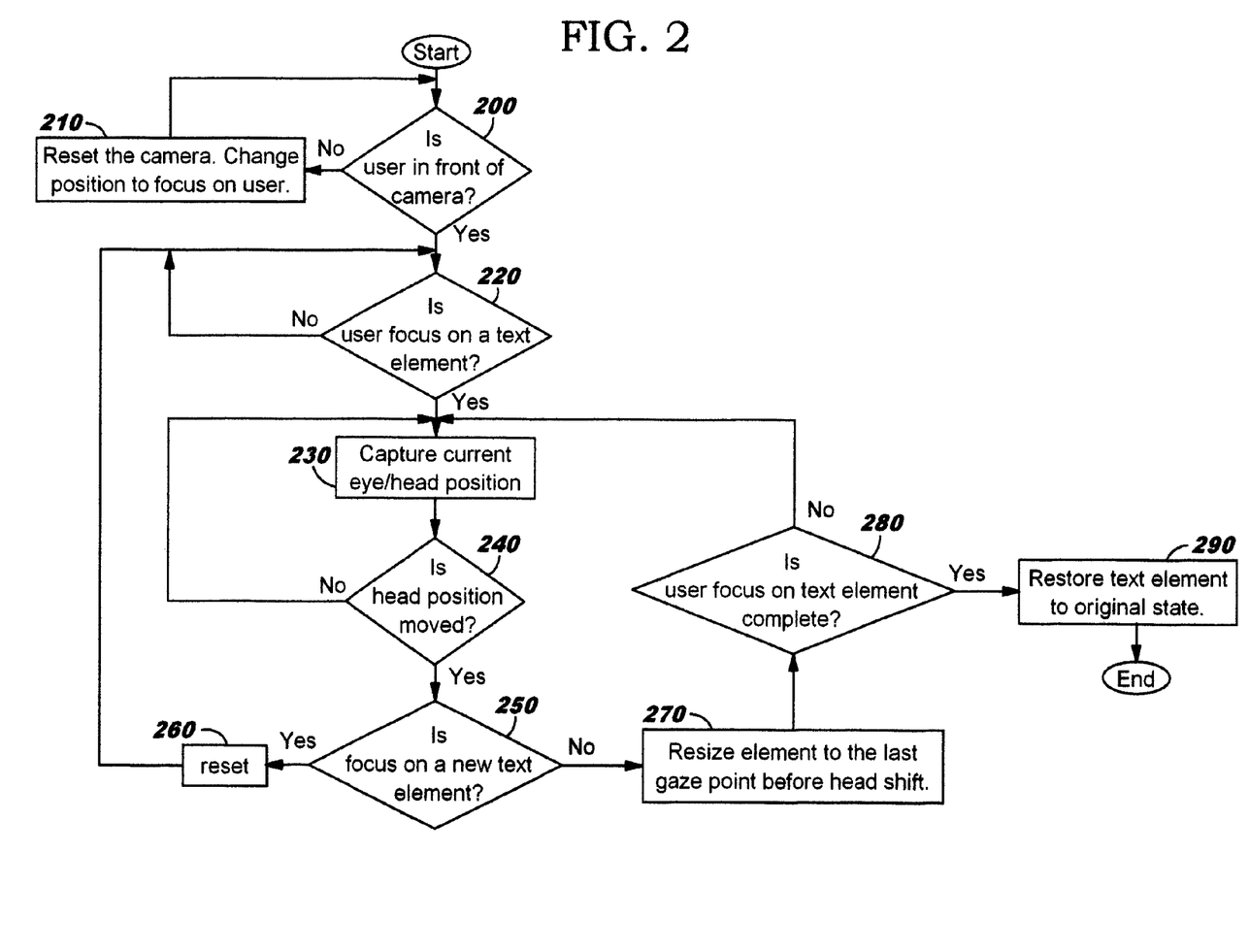
FIG. 2 provides a flowchart depicting logic which may be used when implementing an embodiment of the present invention.

FIG. 2 provides a flowchart depicting logic which may be used when implementing an embodiment of the present invention. Block 200 tests whether the user is currently in front of the camera. If not, then Block 210 preferably resets the camera such that its position is changed to focus on the user. After resetting the camera, control returns to Block 200 to verify whether the camera is now properly positioned. When the test in Block 200 has a positive result, then Block 220 tests whether the user is currently focused on a text display element. If not, then processing preferably loops until the user is detected to be focused on a text display element. As noted earlier, snapshots are preferably taken of the user at regular intervals, and the test at Block 220 preferably uses the most-recent snapshot. Techniques are known for programmatically evaluating photographic images to determine various facial features, and such techniques are preferably leveraged by an embodiment of the present invention for evaluating the captured snapshots.

When the test at Block 220 has a positive result, signifying that the user is focusing on a text display element, processing continues at Block 230 by capturing the user's current eye and head positions from the most-recent snapshot. This preferably comprises determining coordinates of where the user's eyes are looking (i.e., focused) and where the user's head is positioned, through automated inspection of a snapshot image, with reference to the camera's field of vision. The term "gaze point" is used hereinafter to refer to the position at which the user's eyes are looking. Preferably, a tuple of data is stored (at least temporarily) each time Block 230 is executed, each tuple containing the detected gaze point and corresponding head position as determined from a snapshot. Optionally, other information may be stored in the tuples.

Block 240 then tests whether the newly-captured position of the user's head indicates that the user has moved his head as compared to the most-recent, previously-captured head position. If this test has a negative result, control returns to Block 230 to capture an updated snapshot and determine updated eye and head positions of the user, after which the test in Block 240 will be performed again using this new information. When the test at Block 240 has a positive result, indicating that a change in the user's head position is detected, processing continues at Block 250.

Block 250 tests whether the user is now focused on a new (i.e., different) text display element, following the detected head position change. For example, the user might have been focused on text shown at reference number 100 of FIG. 1 when Blocks 220-240 were executed, but has now moved his focus to a different text display element as shown at reference number 150 of FIG. 1, where this different text display element appears beneath a FIG. 140 in the example of FIG. 1. Accordingly, when the test at Block 250 has a positive result, Block 260 performs a reset operation. This reset preferably comprises discarding the tuples that were previously stored, in preparation for evaluating the user's eye and head positions with regard to the text display element where the user is now focused. After the reset, control returns to Block 220 to monitor the user's viewing of the displayed text in the new text display element. Otherwise, when the test at Block 250 has a negative result, processing continues at Block 260 which resizes the text display element to the last gaze point which was detected before the user's head position shifted. This preferably comprises inspecting the stored tuples to locate the most-recent tuple prior to the detected head position change, and obtaining the gaze point from that stored tuple. This gaze point approximates the furthest position within the displayed line of text that was viewed by the user without head movement. Accordingly, an embodiment of the present invention selects the location of this gaze point as the new extent, or width, of the text display element. Block 270 therefore resizes the text display element to this new width.

In one approach to the resizing, operations encoded in a style sheet may be used to resize the text display element which is hosting the displayed text. In another approach, scripting commands may be executed to resize the text display element. For example, JavaScript® commands may be invoked from the document object model, or "DOM", which was previously created from parsing a markup language document to render the displayed text. ("JavaScript" is a registered trademark of Sun Microsystems, Inc. in the United States, other countries, or both.) A markup language such as Dynamic Hypertext Markup Language ("DHTML") may be used with an embodiment of the present invention. DHTML allows metadata or variables corresponding to a text display element to be modified dynamically, while the text display element is currently rendered. An embodiment of the present invention can thereby modify the width of the text display element when performing a resizing operation. User interface widgets may be invoked for the resizing, where these widgets access the metadata corresponding to the text display element and use that metadata when performing a resizing operation. Other types of display controls may be used for resizing the text display element without deviating from the scope of the present invention. Optionally, the user may be prompted to confirm whether the resizing of the text display element will be performed.

Following the resizing, the text display element is now narrower. (The size of the text itself is not changed, however, in preferred embodiments.) Preferably, all of the displayed text is automatically reflowed within the narrower text display element, causing the text to wrap within the new extent of the text display element. The text is preferably accessed using the DOM. By viewing the text in this narrower text display element, the user may now read the text by moving his gaze down the page, without needing to move his head from side to side. It may happen in some cases, however, that the lines of text are still long enough that they require head movement. To account for this, the logic depicted in FIG. 2 provides for ongoing monitoring of head movement by the user. Accordingly, Block 280 tests whether the user's focus on the text display element is now complete. If so, then Block 290 preferably restores the text display element to its original state (including its original size), after which the processing of FIG. 2 ends. Otherwise, when the user remains focused on the text display element (indicated by a negative result at Block 280), the evaluation for head movement is iteratively performed by returning control to Block 230 to capture the latest eye and head positions of the user.

Figure 3:
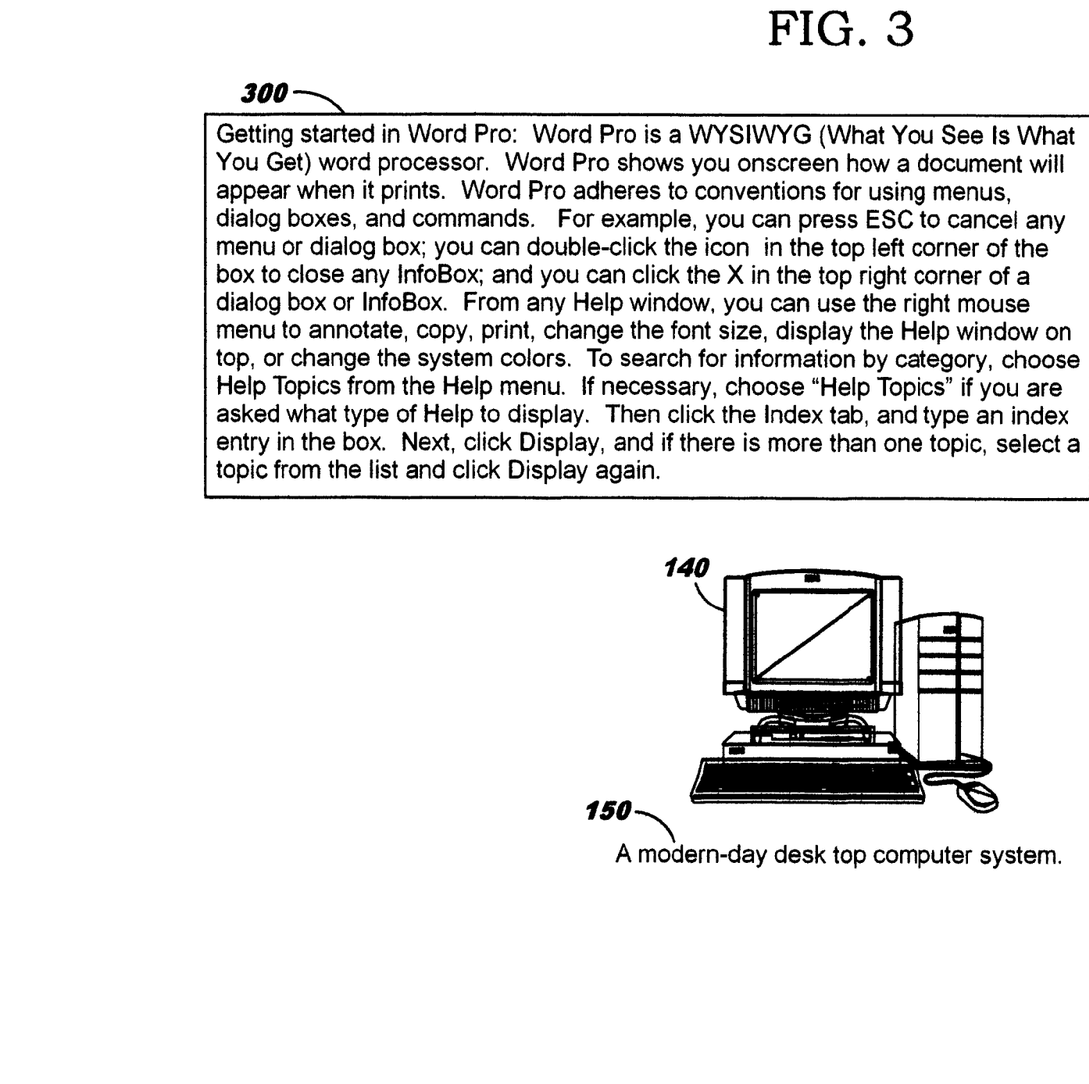
FIG. 3 illustrates the example of displayed text from FIG. 1, following a dynamic resizing of a text display element which is hosting the displayed text, using techniques disclosed herein.

FIG. 3 illustrates how the displayed text from FIG. 1 may appear after a dynamic resizing of a text display element using techniques which were described above with reference to FIG. 2. As can be seen by comparison to FIG. 1, it is more likely that the user can read the displayed text without moving his head from side to side, and it is therefore less likely that the user will lose his place while reading the displayed text. Improved text comprehension may result as the user is less distracted by attempting to keep his place within the text.

The degree to which a text display element hosting particular text is narrowed by the dynamic resizing disclosed herein may vary from one user to another, depending on the detected gaze points and head positions for the user.

Note that while the edges of the text display element 300 are viewable in the example of FIG. 3, this is by way of illustration and not of limitation: the edges may be non-viewable without departing from the scope of the present invention (depending, for example, on the properties of the text display element).

An embodiment of the present invention may be particularly advantageous for large display screens, and/or for display screens which are positioned relatively close to the user, where the text display element may be relatively wide before the dynamic resizing disclosed herein is performed. An embodiment of the present invention may be used with so-called "e-books", where the text of downloaded books is displayed on a display device, and an embodiment of the present invention allows for adjusting the anchor points of the displayed text for readability. The text display area on a public kiosk or other type of public display may be dynamically adjusted for ease of viewing by individual readers using techniques disclosed herein.

Figure 4:
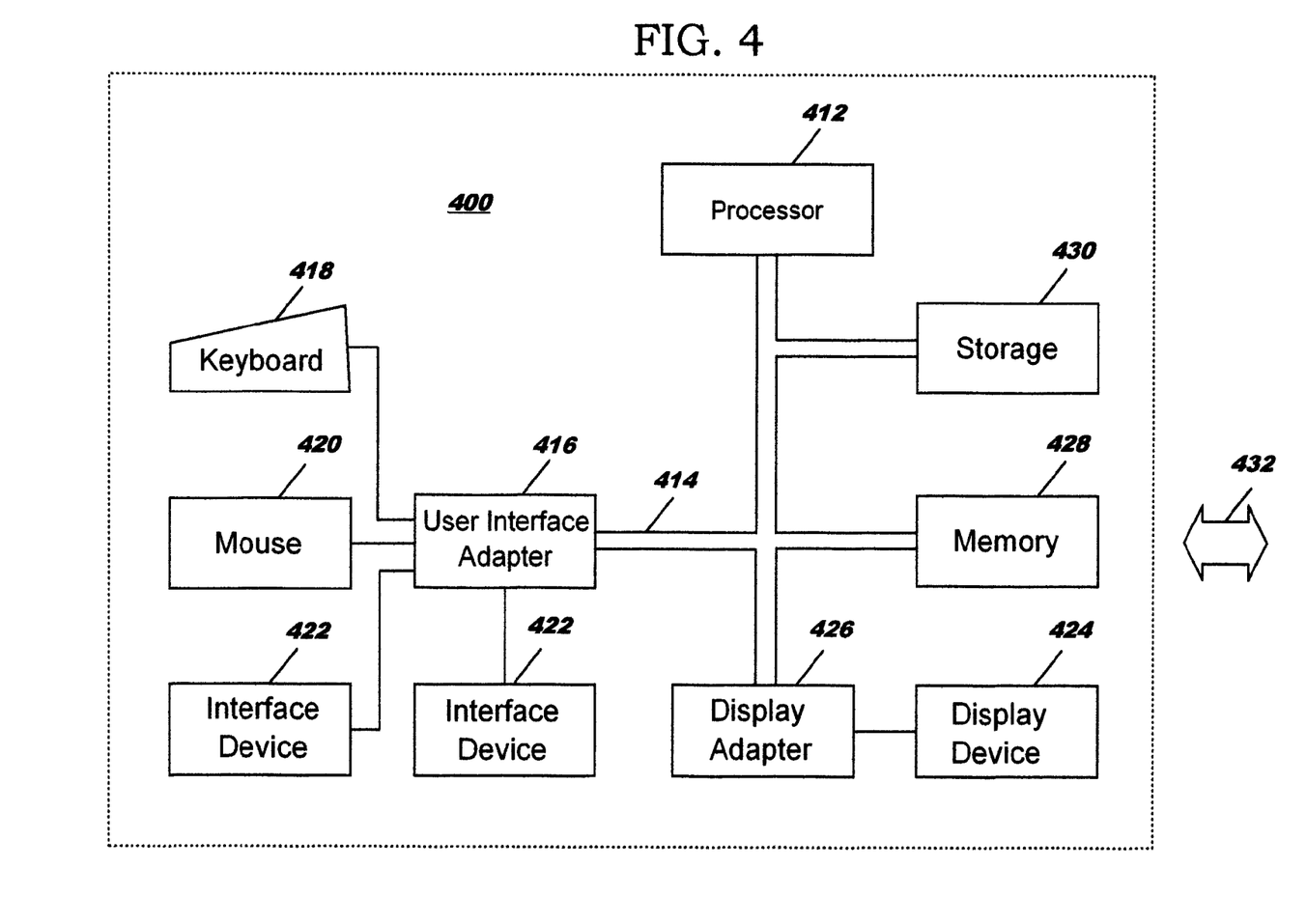
FIG. 4 depicts a data processing system suitable for storing and/or executing program code.

Referring now to FIG. 4, a data processing system 400 suitable for storing and/or executing program code includes at least one processor 412 coupled directly or indirectly to memory elements through a system bus 414. The memory elements can include local memory 428 employed during actual execution of the program code, bulk storage 430, and cache memories (not shown) which provide temporary storage of at least some program code in order to reduce the number of times code must be retrieved from bulk storage during execution.

Input/output ("I/O") devices (including but not limited to keyboards 418, displays 424, pointing devices 420, other interface devices 422, etc.) can be coupled to the system either directly or through intervening I/O controllers or adapters (416, 426).

Network adapters may also be coupled to the system to enable the data processing system to become coupled to other data processing systems or remote printers or storage devices through intervening private or public networks (as shown generally at 432). Modems, cable modem attachments, wireless adapters, and Ethernet cards are just a few of the currently-available types of network adapters.

Figure 5:
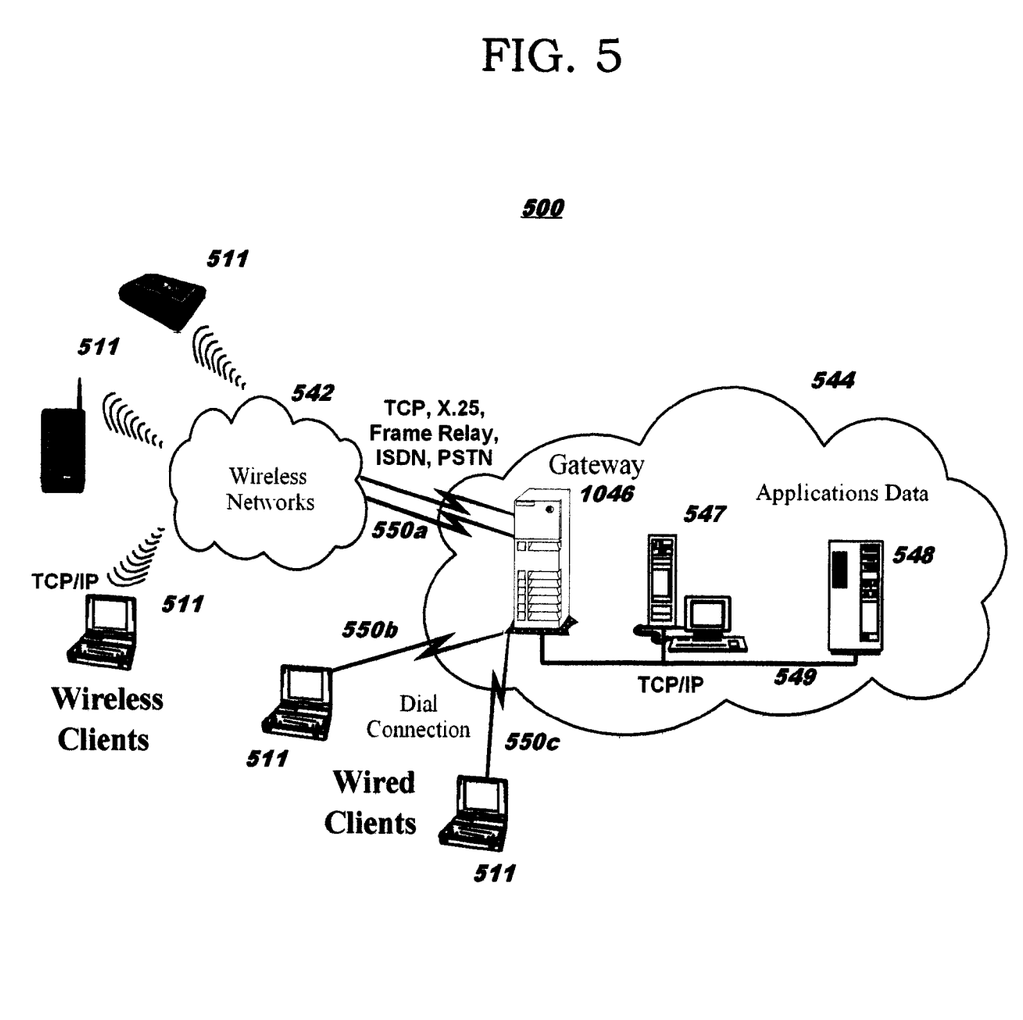
FIG. 5 depicts a representative networking environment in which one or more embodiments of the present invention may be used.

FIG. 5 illustrates a data processing network environment 500 in which the present invention may be practiced. The data processing network 500 may include a plurality of individual networks, such as wireless network 542 and wired network 544. A plurality of wireless devices 510 may communicate over wireless network 542, and a plurality of wired devices, shown in the figure (by way of illustration) as workstations 511, may communicate over network 544. Additionally, as those skilled in the art will appreciate, one or more local area networks ("LANs") may be included (not shown), where a LAN may comprise a plurality of devices coupled to a host processor.

Still referring to FIG. 5, the networks 542 and 544 may also include mainframe computers or servers, such as a gateway computer 546 or application server 547 (which may access a data repository 548). A gateway computer 546 serves as a point of entry into each network, such as network 544. The gateway 546 may be preferably coupled to another network 542 by means of a communications link 550a. The gateway 546 may also be directly coupled to one or more workstations 511 using a communications link 550b, 550c, and/or may be indirectly coupled to such devices. The gateway computer 546 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks of IBM in the United States, other countries, or both, and "System i" is a trademark of IBM.)

The gateway computer 546 may also be coupled 549 to a storage device (such as data repository 548).

Those skilled in the art will appreciate that the gateway computer 546 may be located a great geographic distance from the network 542, and similarly, the workstations 511 may be located some distance from the networks 542 and 544, respectively. For example, the network 542 may be located in California, while the gateway 546 may be located in Texas, and one or more of the workstations 511 may be located in Florida. The workstations 511 may connect to the wireless network 542 using a networking protocol such as the Transmission Control Protocol/Internet Protocol ("TCP/IP") over a number of alternative connection media, such as cellular phone, radio frequency networks, satellite networks, etc. The wireless network 542 preferably connects to the gateway 546 using a network connection 550a such as TCP or User Datagram Protocol ("UDP") over IP, X.25, Frame Relay, Integrated Services Digital Network ("ISDN"), Public Switched Telephone Network ("PSTN"), etc. The workstations 511 may connect directly to the gateway 546 using dial connections 550b or 550c. Further, the wireless network 542 and network 544 may connect to one or more other networks (not shown), in an analogous manner to that depicted in FIG. 5.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computing device through any type of network, including a local area network ("LAN") or a wide area network ("WAN"), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Flowcharts and block diagrams in the figures herein illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method of dynamically resizing a text area in which text is displayed on a display device, comprising:
responsive to detecting head movement by a user viewing the displayed text, determining a position where the user focused in the displayed text prior to detecting the head movement and dynamically resizing the text area to use the determined position as a new width for the text area, wherein:
detecting the head movement further comprises:
tracking positions of the user's head as the user views the displayed text; and
comparing the tracked positions of the user's head to determine whether the user's head has moved; and
determining the position where the user focused in the displayed text further comprises:
tracking positions of the user's eye focus as the user views the displayed text, each tracked position of the user's eye focus associated with one of the tracked positions of the user's head; and responsive to determining that the user's head has moved, determining a particular one of the tracked positions of the user's head which immediately precedes the detected head movement and using, as the determined position where the user focused in the displayed text, the tracked position of the user's eye focus which is associated with the particular one of the tracked positions of the user's head.

2. The method according to claim 1, further comprising redisplaying the text in the dynamically resized text area.

3. The method according to claim 1, wherein a plurality of snapshots taken by a camera device are used for tracking the positions of the user's head as the user views the displayed text and for tracking the positions of the user's eye focus as the user views the displayed text.

4. The method according to claim 2, wherein the camera device is integrated into a device which houses the display device.

5. The method according to claim 3, wherein the camera device is independent of a device which houses the display device but positioned to take the plurality of snapshots of the user.

6. The method according to claim 3, wherein the snapshots are taken by the camera device at configured intervals.

7. The method according to claim 1, wherein dynamically resizing the text area to use the determined position as a new width for the text area comprises applying a style sheet to set the position as the new width.

8. The method according to claim 1, wherein dynamically resizing the text area to use the determined position as a new width for the text area comprises executing at least one script command to set the position as the new width.

9. A system for dynamically resizing a text area in which text is displayed on a display device, comprising:
a computer comprising a processor; and
instructions which are executable, using the processor, to implement functions comprising:
responsive to detecting head movement by a user viewing the displayed text, determining a position where the user focused in the displayed text prior to detecting the head movement and dynamically resizing the text area to use the determined position as a new width for the text area, wherein:
detecting the head movement further comprises:
tracking positions of the user's head as the user views the displayed text; and
comparing the tracked positions of the user's head to determine whether the user's head has moved; and
determining the position where the user focused in the displayed text further comprises:
tracking positions of the user's eye focus as the user views the displayed text, each tracked position of the user's eye focus associated with one of the tracked positions of the user's head; and
responsive to determining that the user's head has moved, determining a particular one of the tracked positions of the user's head which immediately precedes the detected head movement and using, as the determined position where the user focused in the displayed text, the tracked position of the user's eye focus which is associated with the particular one of the tracked positions of the user's head.

10. The system according to claim 9, wherein the functions further comprise redisplaying the text in the dynamically resized text area.

11. The system according to claim 9, wherein a plurality of snapshots taken by a camera device are used for tracking the positions of the user's head as the user views the displayed text and for tracking the positions of the user's eye focus as the user views the displayed text.

12. A computer program product for dynamically resizing a text area in which text is displayed on a display device, the computer program product comprising:
a non-transitory computer readable storage medium having computer readable program code embodied therein, the computer readable program code configured for:
responsive to detecting head movement by a user viewing the displayed text, determining a position where the user focused in the displayed text prior to detecting the head movement and dynamically resizing the text area to use the determined position as a new width for the text area, wherein:
detecting the head movement further comprises:
tracking positions of the user's head as the user views the displayed text; and
comparing the tracked positions of the user's head to determine whether the user's head has moved; and
determining the position where the user focused in the displayed text further comprises:
tracking positions of the user's eye focus as the user views the displayed text, each tracked position of the user's eye focus associated with one of the tracked positions of the user's head; and
responsive to determining that the user's head has moved, determining a particular one of the tracked positions of the user's head which immediately precedes the detected head movement and using, as the determined position where the user focused in the displayed text, the tracked position of the user's eye focus which is associated with the particular one of the tracked positions of the user's head.

13. The computer program product according to claim 12, wherein the computer readable program code is further configured for redisplaying the text in the dynamically resized text area.

14. The computer program product according to claim 12, wherein a plurality of snapshots taken by a camera device are used for tracking the positions of the user's head as the user views the displayed text and for tracking the positions of the user's eye focus as the user views the displayed text.

* * * * *